Figure 1:
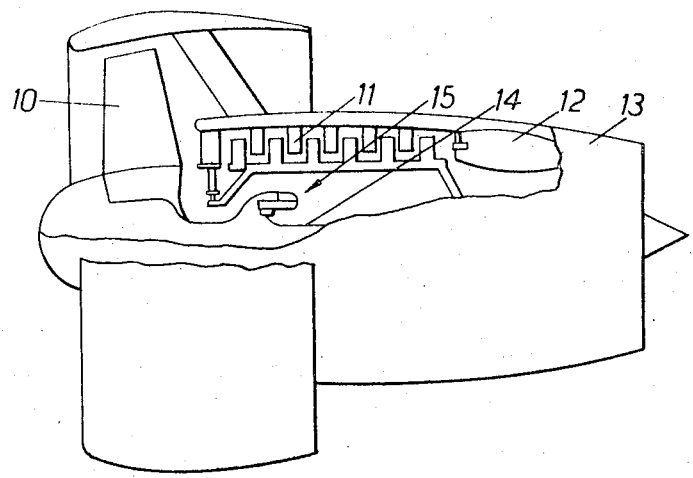

United States Patent [19]
Gilbert et al.

[11] 3,808,913
[45] May 7, 1974

[54] EPICYCLIC GEAR TRAIN

[75] Inventors: Ronald Albert Gilbert, Allestree;
James Alexander Petrie, Littleover;
Kenneth Edward George Bracey,
Findern, all of England

[73] Assignee: Rolls-Royce (1971) Limited,
London, England

[22] Filed: Aug. 4, 1972

[21] Appl. No.: 278,027

[30] Foreign Application Priority Data
Aug. 11, 1971    Great Britain.................... 37687/71

[52] U.S. Cl. .............................................. 74/801
[51] Int. Cl. ........................................... F16h 1/28
[58] Field of Search ....................................... 74/801

[56] References Cited
UNITED STATES PATENTS
2,095,794   10/1937   Corbin................................. 74/801
2,759,376   8/1956   Chamberlin et al. ................. 74/801
2,825,247   3/1958   Haworth et al....................... 74/801
3,160,026   12/1964   Rosen............................... 74/801 X
3,207,003   9/1965   Kronogard....................... 74/801 X
3,258,995   7/1966   Bennett et al. ....................... 74/801

Primary Examiner—A. T. McKeon
Attorney, Agent, or Firm—Cushman, Darby & Cushman

[57] ABSTRACT

An epicyclic gear train comprising a sun gear, a plurality of planet gears meshing with the sun gear and carried from a carrier rotatable about the sun gear axis, and an annulus gear conical with the sun gear and meshing with the planet gears, each of the gears having single helical teeth and the sun and annulus gears being axially displaced to reduce the tipping couple on the planet gears, drive being taken from or to the planet carrier solely on a plane or planes perpendicular to the rotational axis of the carrier and lying between the engagements between the planet gears and the sun gear, and the planet gears.

7 Claims, 3 Drawing Figures

PATENTED MAY 7 1974　3,808,913

EPICYCLIC GEAR TRAIN

This invention relates to an epicyclic gear train, and is particularly concerned with such a gear train having single helical teeth.

Epicyclic gears having single helical teeth suffer from the disadvantage that in addition to the normal separating loads on the teeth, a so-called tipping couple is produced on the planet gears due to helical thrust. It has been proposed in our co-pending U.S. Pat. application Ser. No. 214,942, now U.S. Pat. No. 3,754,484, that the tipping couple could be counter-balanced by axially displacing the sun gear and annulus gear so that the counteracting couple is produced by the separation loads.

This relieves the planet cage of the tipping couple, but the carrier must be made very rigid so that the driving loads from the planet gears will cause only small torsional deflections in the carrier, to ensure satisfactory tooth bedding.

The present invention provides a construction in which this drive load is taken out from the center of the cage in a symmetrical fashion thus enabling the cage to be considerably tightened, at the same time ensuring good alignment of the teeth.

According to the present invention an epicyclic gear train comprises a sun gear, at least one planet gear meshing with the sun gear and carried from a carrier rotatable about the sun gear axis, and an annulus gear co-axial with the sun gear and meshing with the planet gear or gears, each said gear comprising single helical teeth, and said sun gear and annulus gear being axially displaced so as to reduce or eliminate the tipping couple on the planet gears, and in which drive is taken from or to said planet carrier solely on a plane or planes perpendicular to the rotational axis of the carrier and lying between the engagements between the planet gears and the sun gear, and the planet gears and the annulus gear.

Preferably the annulus gear and the sun gear are axially displaced by an amount sufficient to leave a space between their engagements on the planet gears. In this case, that portion of the planet gears which does not engage either the sun gear or annulus gear may be left without teeth.

In a preferred embodiment the carrier comprises end plates which carry the pinion gear shafts, separate interconnecting members which interconnect the end plates, and a central flange joined to the interconnecting members and from which or to which drive may be taken. We prefer to make the interconnecting members and the central flange in one piece, the end plates being made separately and bolted to the interconnecting means.

The carrier may be supported by the drive shafting which is connected to the central flange, and it may also be provided with a further support on the side remote from the shafting; this further support may conveniently comprise an oil transfer collar.

Figure 2:
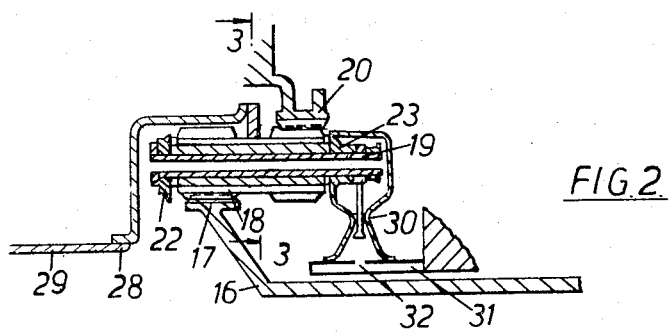
Figure 3:
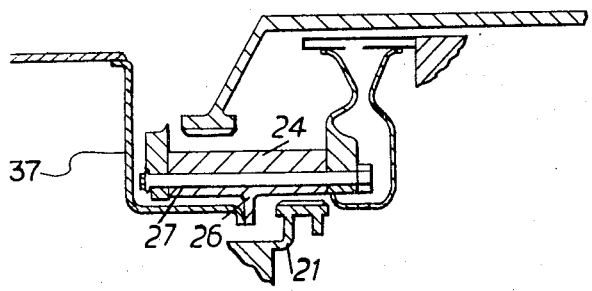
Figure 3:
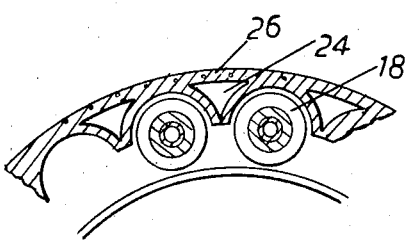

The invention will now be particularly described merely by way of example with reference to the accompanying drawings in which:

FIG. 1 is a partly broken away view showing a gas turbine engine incorporating a gear train in accordance with the invention, FIG. 2 is an enlarged section of the gear train of FIG. 1 and FIG. 3 is a section on the line 3—3 of FIG. 2.

In FIG. 1 there is shown a gas turbine engine comprising a fan 10 and a gas generator section comprising a compressor 11, combustion section 12 and turbine 13. Within the turbine there is provided a fan turbine which drives a fan shaft 14 and hence drives the fan 10 through an epicyclic gear train 15.

FIG. 2 shows the gear train 15 in greater detail. The turbine shaft 14 is formed with a conical flange 16 which carries on its outer periphery a sun gear 17. The sun gear meshes with a plurality of planet gears 18 which are carried on bearing pinions 19 from a carrier.

The sun gear 17 engages only with one end portion of the pinion gears 18, and the gears are extended to the right as shown in the drawings to form a further tooth portion which engages with an annular reaction gear 20. The gear 20 is supported from fixed structure of the engine by a flange 21.

To carry drive from the pinions 18 to the fan 10, the pinion carrier is made up from a pair of end plates 22 and 23 which support the pinion shafts 19. These end plates are held together by interconnecting members 24 which fit in the external space between the pinions (see FIG. 3) and which are formed integral with a central drive flange 26. Through bolts 27 retain the end plates to the interconnecting members 24.

The drive flange 26 is extended to fill substantially all the inter-pinion space so that it can be made as strong as possible without extending the overall diameter of the gear train. To this end the pinions 18 have their teeth cut away over their central portions which do not engage with the sun gear 17 or the annulus gear 20.

Drive is taken from the flange 26 by a shaft 37 which is connected through splines 28 to the fan shaft 29.

To provide lubrication for the pinion bearings and additionally to support the right hand end of the pinion carrier, an oil transfer collar 30 is provided. This collar comprises a pair of flanges connected to the internal and external periphery respectively of the right hand end plate 23. These flanges are sealed to the stationary structure of the engine at 31. Passages 32 enable lubricant to flow into the space between the flanges and consequently to flow to the pinion shafts. Additionally the transfer collar 30 is made sufficiently strong to act as a support for the planet carrier 22.

Operation of the system is as follows. Since the sun gear, planet gears and annulus gear are all single helical gears, the tooth loads cause a tipping couple to be produced on the pinions 18. Owing to the axial offset of the sun gear and the annulus gear, there is a counteracting coupled which is caused by the separating loads between the pinions and the sun and annulus gears. By choosing the tooth angles it is possible to arrange that these couples cancel out or at least substantially oppose each other's effect.

Even this expedient by itself does not completely remove unsatisfactory stresses from the carrier, since the drive load must be taken from the carrier. With the above construction the drive load is taken out from the flange 26 which is mounted between the engagements of the pinions and the sun and annulus gears. There is therefore no asymmetrical load on the carrier, and the distortions which are produced on the carrier are not such as to cause malalignment of the gears. Therefore, for the same transmitted power it is possible to make the carrier considerably lighter than would be the case without using the present invention.

The carrier design outlined above is particularly simple and effective, and it will be noted that the projections from the drive flange are integral with the flange, giving a strong section where the loads are highest. As can be seen from FIG. 3 the interconnecting members are made as large in section as possible and are easily machined to form a flat surface which engages with the end plates.

It will be possible to modify the carrier design referred to above without departing from the invention. Thus it will be possible in some circumstances to make the carrier as a single piece having a central drive connection.

It would also be possible to take the drive out from the pinion carrier internally rather than externally of the carrier. It will be appreciated by those skilled in the art that this will involve detail changes to the carrier construction described above but will not affect the principle of the device.

Again although the invention was described in its application to a gas turbine engine, it would equally be applicable to other epicyclic gear trains where lightness is required. In particular it could be arranged that the planet carrier is driven rather than drives from the central flange; this would obviously involve a different gear system.

We claim:

1. A simple epicyclic gear train including a single sun wheel, a plurality of planet wheels and a single surrounding annulus gear, all of which have teeth of a single helix angle, wherein the sun wheel and annulus gear are relatively axially displaced along the planet wheels so as to mesh with different axial portions of the teeth on said planet wheels, and wherein radial components of the tooth loads on the planet wheels, due to the pressure angles of the teeth, produce a couple which opposes the tipping moment on the planet wheels due to the sun wheel and annulus gear meshing with the teeth of a single helix angle wherein the improvement comprises drive flange means attached to planet gear carrier means wherein drive is taken with respect to said planet carrier solely in a direction perpendicular to the rotational axis of said carrier and between the engagements of the sun and annulus gears with the planet gears.

2. An epicyclic gear train as claimed in claim 1, in which the annulus gear and the sun gear are axially displaced by an amount sufficient to leave a space between their engagements on the planet gears.

3. An epicyclic gear train as claimed in claim 2, in which that portion of the planet gears which does not engage either the sun gear or annulus gear is left without teeth.

4. An epicyclic gear train as claimed in claim 1, in which the carrier comprises end plates, pinion gear shafts carried from the end plates, separate interconnecting members which interconnect the end plates, and a central flange joined to the interconnecting members and from which or to which drive may be taken.

5. An epicyclic gear train as claimed in claim 4, in which the interconnecting members and the central flange are integral with each other, the end plate being made separately and bolted to the interconnecting means.

6. An epicyclic gear train as claimed in claim 4, in which the carrier is supported by drive shafting which is connected to the central flange, and is provided with a further support on the side remote from the shafting.

7. An epicyclic gear as claimed in claim 6, in which the further support comprises an oil transfer collar.

* * * * *